(12) United States Patent
Fujita et al.

(10) Patent No.: US 11,525,394 B2
(45) Date of Patent: Dec. 13, 2022

(54) TURBINE SHAFT, TURBOCHARGER, AND MANUFACTURING METHOD OF TURBOCHARGER

(71) Applicant: MITSUBISHI HEAVY INDUSTRIES ENGINE & TURBOCHARGER, LTD., Sagamihara (JP)

(72) Inventors: Yutaka Fujita, Tokyo (JP); Yosuke Danmoto, Sagamihara (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 0 days.

(21) Appl. No.: 17/044,142

(22) PCT Filed: Aug. 7, 2018

(86) PCT No.: PCT/JP2018/029609
§ 371 (c)(1),
(2) Date: Sep. 30, 2020

(87) PCT Pub. No.: WO2020/031262
PCT Pub. Date: Feb. 13, 2020

(65) Prior Publication Data
US 2021/0123381 A1  Apr. 29, 2021

(51) Int. Cl.
*F02C 6/12* (2006.01)
*F02B 39/00* (2006.01)
(Continued)

(52) U.S. Cl.
CPC ............... *F02C 6/12* (2013.01); *F02B 39/00* (2013.01); *F01D 9/026* (2013.01); *F04D 29/266* (2013.01);
(Continued)

(58) Field of Classification Search
CPC .. F04D 29/167; F04D 29/4293; F04D 29/628; F04D 29/605; F04D 29/426; F05D 2230/21; F05D 2260/94
See application file for complete search history.

(56) References Cited

U.S. PATENT DOCUMENTS 3,612,719 A * 10/1971 Nomura ................. F01D 5/025
　　　　　　　　　　　　　　　　　　　　　　　　　416/133
6,012,901 A *  1/2000 Battig .................. F04D 29/266
　　　　　　　　　　　　　　　　　　　　　　　　　416/244 A
(Continued)

FOREIGN PATENT DOCUMENTS

CN　　　　1212320 A　　　3/1999
CN　　102444614 A *　5/2012
(Continued)

OTHER PUBLICATIONS

Extended European Search Report for European Application No. 18929443.2, dated Nov. 9, 2020.
(Continued)

*Primary Examiner* — J. Todd Newton
(74) *Attorney, Agent, or Firm* — Birch, Stewart, Kolasch & Birch, LLP

(57) ABSTRACT

A turbine shaft used for a turbocharger including a turbine and a compressor includes a turbine impeller, and a rotor shaft joined on one end side to the turbine impeller. The rotor shaft includes a fitting region configured to fit with a compressor impeller of the compressor by inserting the other end side of the rotor shaft into a through hole formed in the compressor impeller, a fastening region formed between the fitting region and the other end side of the rotor shaft, and configured to allow fastening by a fastening part, and a tapered part having a maximum outer diameter at a position closest to the turbine impeller in the fitting region and formed such that an outer diameter of the rotor shaft (Continued)

decreases from the position closest to the turbine impeller toward a tip side of the compressor impeller.

5 Claims, 8 Drawing Sheets

(51) Int. Cl.
*F04D 29/26* (2006.01)
*F04D 29/28* (2006.01)
*F01D 9/02* (2006.01)

(52) U.S. Cl.
CPC ........ *F04D 29/284* (2013.01); *F05D 2220/40* (2013.01); *F05D 2240/60* (2013.01); *F05D 2250/292* (2013.01); *F05D 2260/31* (2013.01)

(56) References Cited

U.S. PATENT DOCUMENTS

| | | | |
|---|---|---|---|
| 10,683,870 B2 * | 6/2020 | Okabe | .................. F01D 11/122 |
| 2013/0129523 A1 * | 5/2013 | Garrard | ..................... F01D 5/12 |
| | | | 416/241 R |
| 2021/0123381 A1 * | 4/2021 | Fujita | ...................... F01D 5/025 |

FOREIGN PATENT DOCUMENTS

| | | | | |
|---|---|---|---|---|
| CN | 103846613 A | * | 6/2014 | |
| DE | 1 036 273 B | | 8/1958 | |
| DE | 44 45 297 C1 | | 3/1996 | |
| JP | 34-17515 Y1 | | 10/1959 | |
| JP | 59-170601 U | | 11/1984 | |
| JP | 2-207195 A | | 8/1990 | |
| JP | 2-221601 A | | 9/1990 | |
| JP | 2001173597 A | * | 6/2001 | |
| JP | 2005291152 A | * | 10/2005 | |
| JP | 2908-9634 A | | 1/2006 | |
| JP | 2006009634 A | * | 1/2006 | |
| JP | 2009221870 A | * | 10/2009 | |
| JP | 2017-101641 A | | 6/2017 | |
| WO | WO-2013165840 A1 | * | 11/2013 | ............ F01D 5/025 |

OTHER PUBLICATIONS

Japanese Office Action for Japanese Application No. 2020-35370, dated Aug. 24. 2021, with English translation.
Chinese Office Action dated Nov. 30, 2021 issued in counterpart Chinese Application No. 201880094319.1 with English Translation.

* cited by examiner

One end side ←——————→ Other end side
Axial direction

One end side ←——————→ Other end side
Axial direction

One end side ←——→ Other end side
Axial direction

One end side ←——————→ Other end side
Axial direction

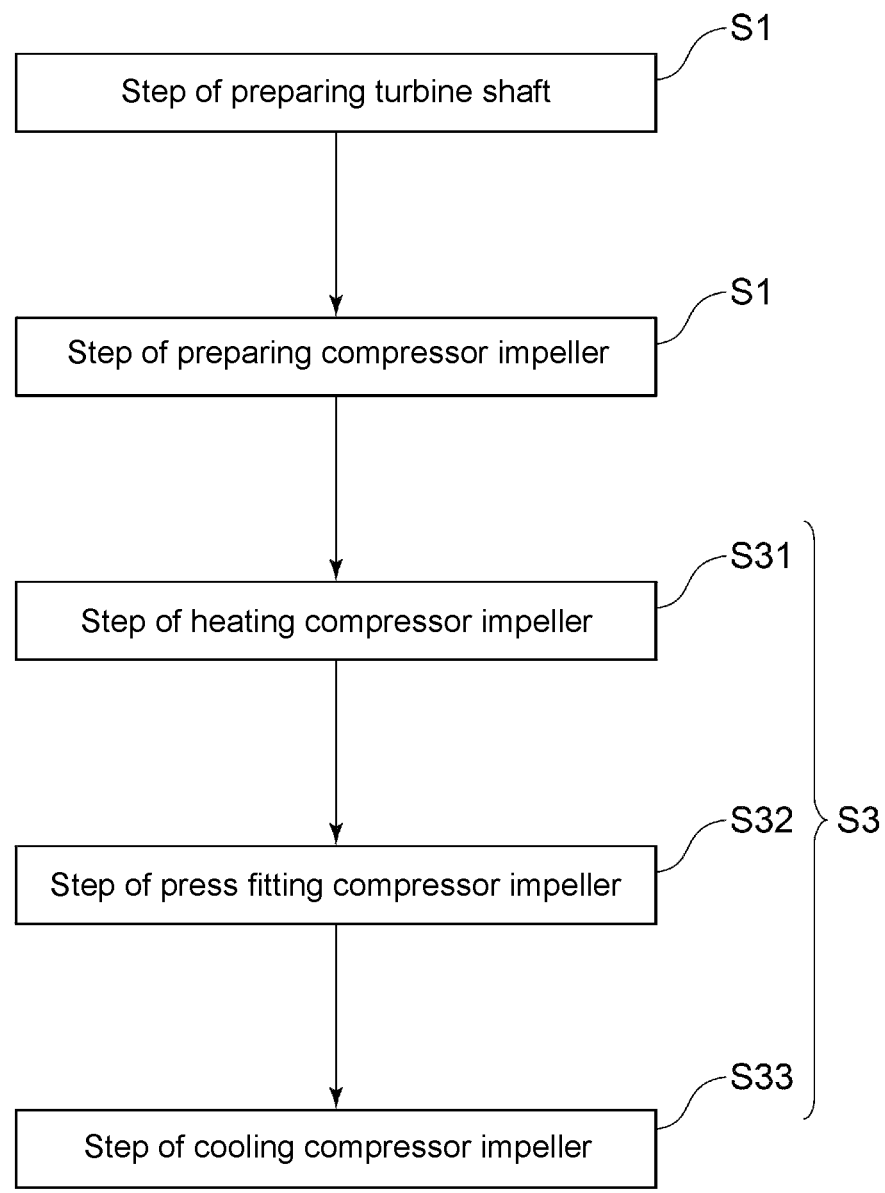

TURBINE SHAFT, TURBOCHARGER, AND MANUFACTURING METHOD OF TURBOCHARGER

TECHNICAL FIELD

The present disclosure relates to a turbine shaft, a turbocharger, and a manufacturing method of the turbocharger.

BACKGROUND

Conventionally, in a typical turbocharger, a turbine impeller is joined to one end side of a rotor shaft, and a compressor impeller is mounted on the other end side of the rotor shaft. A part obtained by integrating the rotor shaft and the turbine impeller is referred to as a turbine shaft. On the other end side of the rotor shaft, a male screw is cut at a tip part. The make screw is inserted into a through hole formed in the compressor impeller from a back surface side of the compressor impeller. At this time, an end surface on the back surface side of the compressor impeller is made abut on a sleeve attached to the rotor shaft of the turbine shaft or a flange part formed in the rotor shaft. Furthermore, a nut is attached to the male screw, which is cut on the other end side of the rotor shaft protruding from the tip side of the compressor impeller (the opposite side to the back surface of the compressor impeller), to fasten. Thus, pressed against the sleeve or the flange part, the compressor impeller is mounted on the turbine shaft and is fixed so as not to slip out. In the present specification, a part, such as the sleeve or the flange part that receives an axial force generated by fastening the nut may be referred to as an "axial force receiving part".

In such a typical turbocharger, rotating the rotor shaft and the compressor impeller at a high speed, the compressor impeller slightly extends with elastic deformation in the radial direction and slightly contracts in the axial direction of the rotor shaft, by a centrifugal force. If the compressor impeller contracts in the axial direction, a holding force by the nut is weakened. As a result, the compressor impeller may be shifted relative to the rotor shaft in the rotational direction.

In order to cope with such a problem, in the invention described in Patent Document 1, the outer diameter of a region fitting with a back surface side of a compressor impeller in a rotor shaft is slightly larger than the outer diameter of a region fitting with a tip side of the compressor impeller. Then, fastening, in advance, a nut in a finished turbocharger by a pressing force which is larger than a pressing force of the nut, when the compressor impeller is mounted on the rotor shaft by shrink fitting, the compressor impeller is prevented from being shifted in the rotational direction in a high-speed rotation.

Moreover, Patent Document 2 discloses that a gap is generated between a sleeve and an end surface on the back surface side of a compressor impeller, due to thermal contraction after when the compressor impeller is shrink-fitted to a rotor shaft. In order to address the problem, in the invention described in Patent Document 2, the inner diameter dimension of a through hole of the compressor impeller is set to be the smallest at an end surface position on the back surface side of the compressor impeller abutting on the sleeve. Thus, in the thermal contraction, first, the end surface position on the back surface side of the compressor impeller and the outer surface of the rotor shaft are fitted together at a high surface pressure, making it possible to prevent generation of the gap between the sleeve and the end surface on the back surface side of the compressor impeller.

CITATION LIST

Patent Literature

Patent Document 1: JP2006-9634A
Patent Document 2: JP2017-101641A

SUMMARY

Technical Problem

Meanwhile, as a problem different from the above-described contents, in the typical turbocharger, repeatedly using the turbocharger over a long period of time, the nut may be loosened due to an influence of, for example, a vibration associated with the high-speed rotation of the compressor impeller, generating a minute gap between the nut and the tip surface of the compressor impeller. Thus, the nut is refastened periodically to disperse the minute gap generated between the nut and the tip surface of the compressor impeller.

However, the present inventors have found that a phenomenon may occur in which the minute gap is formed not between the nut and the tip surface of the compressor impeller but between the end surface of the back surface side of the compressor impeller and the axial force receiving part such as the sleeve, when the turbocharger is used repeatedly over the long period of time. The reasons for this are inferred as follows.

That is, when the compressor impeller rotates at a high speed, the through hole extends in the radial direction, and the compressor impeller itself contracts in the axial direction, by the centrifugal force. Then, the through hole having extended in the radial direction is reversed when the rotation stops. At this time, however, the entirety of a fitting region of the rotor shaft fitted to the through hole may not be seated in the through hole simultaneously, but a part of the fitting region may be seated in the through hole ahead of another part. The compressor impeller having contracted in the axial direction is reversed with the antecedently seated part as a starting point. Thus, the compressor impeller is shifted to the tip side, if the antecedently seated part is disposed at a position away from the end surface on the back surface side to the tip side of the compressor impeller.

If the gap is thus formed between the end surface on the back surface side of the compressor impeller and the axial force receiving part such as the sleeve, it is difficult to dissolve the gap just by refastening the nut, increasing a maintenance burden.

In the above description, the case has been described in which the nut screwed to the tip part of the rotor shaft is used as a fastening part when the compressor impeller is mounted on the turbine shaft. However, the fastening part is not limited to the nut.

For example, in a case where the fastening part is a fitting part that has an annular shape having a hole, which is slightly smaller than the outer circumference of the rotor shaft, or a bottomed cylindrical shape (cap shape), and is fitted to the tip part of the rotor shaft to mount the compressor impeller on the turbine shaft, the same problem as the case of the above-described nut may arise.

Thus, in view of the above issue, an object of some embodiments of the present invention is to provide a turbine shaft and a turbocharger capable of suppressing generation of the gap between the compressor impeller and the axial force receiving part, such as the sleeve, even if the fastening part such as the nut is loosened, and reducing the maintenance burden.

Solution to Problem (1) A turbine shaft according to at least one embodiment of the present invention is a turbine shaft used for a turbocharger including a turbine and a compressor, including a turbine impeller of the turbine, and a rotor shaft joined on one end side to the turbine impeller. The rotor shaft includes a fitting region configured to fit with a compressor impeller of the compressor by inserting the other end side of the rotor shaft into a through hole formed in the compressor impeller, a fastening region formed between the fitting region and the other end side of the rotor shaft, and configured to allow fastening by a fastening part, and a tapered part having a maximum outer diameter at a position closest to the turbine impeller in the fitting region and formed such that an outer diameter of the rotor shaft decreases from the position closest to the turbine impeller toward a tip side of the compressor impeller.

With the above configuration (1), the rotor shaft includes the tapered part having the maximum outer diameter at the position closest to the turbine impeller in the fitting region (that is, an end surface position of an axial force receiving part, such as a sleeve, on the side of the compressor impeller), and formed such that the outer diameter of the rotor shaft decreases from the position closest to the turbine impeller toward the tip side of the compressor impeller. Thus, when the compressor impeller, which extends in the radial direction and contracts in the axial direction by a centrifugal force in a high-speed rotation, stops the rotation, the end surface position of the axial force receiving part, such as the sleeve, on the side of the compressor impeller in the fitting region of the rotor shaft is seated in a through hole of the compressor impeller ahead of another part. At this time, the rotor shaft is seated at the position closest to the turbine impeller in the through hole of the compressor impeller, that is, an end surface on a back surface side of the compressor impeller. The axial force receiving part, such as the sleeve, is disposed so as to contact the end surface on the back surface side of the compressor impeller. Thus, the rotor shaft is seated in the through hole of the compressor impeller in a state in which the end surface on the back surface side of the compressor impeller is in contact with the axial force receiving part such as the sleeve. Thus, the compressor impeller having contracted in the axial direction in the high-speed rotation is reversed with the antecedently seated part as a starting point, while maintaining the state in which the end surface on the back surface side of the compressor impeller and the axial force receiving part, such as the sleeve, are in contact with each other. Accordingly, the compressor impeller does not shift to the tip side, making it possible to suppress formation of a gap between the axial force receiving part, such as the sleeve, and the end surface on the back surface side of the compressor impeller.

Thus, with the above configuration (1), it is possible to provide the turbine shaft capable of suppressing generation of the gap between the compressor impeller and the axial force receiving part, such as the sleeve, even if the fastening part is loosened, and reducing a maintenance burden.

Moreover, in the above configuration (1), the above-described tapered part is formed in the rotor shaft. Thus, as compared with a case where a tapered part, which has the maximum inner diameter at the position closest to the turbine impeller in the through hole of the compressor impeller and is formed such that an inner diameter of the through hole increases from the position closest to the turbine impeller toward the tip side of the compressor impeller, is formed on the inner circumferential surface of the through hole of the compressor impeller, it is possible to achieve the following advantageous effects.

That is, a centrifugal force, which is larger than that for the rotor shaft, acts on the compressor impeller, and thus the amount of deformation caused by the centrifugal force in the high-speed rotation is larger in the compressor impeller than in the rotor shaft. Moreover, the outer peripheral surface of the compressor impeller is exposed to intake air which is compressed and becomes hot. Thus, an influence of thermal expansion also acts on the compressor impeller, in addition to the centrifugal force. Thus, a behavior in recovery from the deformation of the compressor impeller when the rotation thereof is stopped is complicated, even if the tapered part is disposed, which has the maximum inner diameter at the position closest to the turbine impeller in the through hole of the compressor impeller and is formed such that the inner diameter of the through hole increases from the position closest to the turbine impeller toward the tip side of the compressor impeller. Thus, the end surface position of the axial force receiving part, such as the sleeve, on the side of the compressor impeller in the fitting region of the rotor shaft may not necessarily be seated in the through hole of the compressor impeller ahead of the another part, when the rotation of the compressor impeller is stopped.

In this regard, only a centrifugal force, which is small compared to that for the compressor impeller, acts on the rotor shaft, and the rotor shaft is hardly influenced by the intake air which is compressed and becomes hot. Thus, it is possible to seat the end surface position of the axial force receiving part, such as the sleeve, on the side of the compressor impeller in the through hole of the compressor impeller ahead of the another part, more stably in a case in which the above-described tapered part is formed in the rotor shaft than in a case in which the tapered part is formed on the inner circumferential surface of the through hole of the compressor impeller. Moreover, manufacture is easier in the case in which the tapered part is formed in the rotor shaft than in the case in which the tapered part is formed on the inner circumferential surface of the through hole of the compressor impeller.

(2) In some embodiments, in the above configuration (1), the tapered part is constituted by an entirely tapered part formed over an entirety of the fitting region.

With the above configuration (2), in the fitting region, the rotor shaft has the maximum outer diameter at the position closest to the turbine impeller in the fitting region (that is, the end surface position of the axial force receiving part, such as the sleeve, on the side of the compressor impeller), and the outer diameter thereof gradually decreases toward the tip side of the compressor impeller. That is, over the entirety of the fitting region, the outer diameter of the rotor shaft decreases gradually from the back surface side toward the tip side of the compressor impeller, from the end surface position of the axial force receiving part, such as the sleeve, on the side of the compressor impeller. Thus, in the rotor shaft fitted to the through hole in the fitting region, the end surface position of the axial force receiving part, such as the sleeve, on the side of the compressor impeller in the fitting region is reliably seated in the through hole ahead of the another part, when the rotation of the compressor impeller is stopped. Subsequently, the rotor shaft is gradually seated in the through hole from the back surface side toward the tip side of the compressor impeller. As a result, the compressor impeller having contracted in the axial direction is reversed with the antecedently seated part as the starting point, while reliably maintaining the state in which the end surface on the back surface side of the compressor impeller and the axial force receiving part, such as the sleeve, are in contact with each other. Thus, it is possible to suppress formation of the gap between the axial force receiving part, such as the sleeve, and the end surface on the back surface side of the compressor impeller, more effectively.

Thus, based on the principle described in the above configuration (1), it is possible to provide the turbine shaft capable of suppressing generation of the gap between the compressor impeller and the axial force receiving part, such as the sleeve, even if the fastening part is loosened, and reducing the maintenance burden.

(3) In some embodiments, in the above configuration (1), the tapered part is constituted by a partially tapered part formed in a part of the fitting region.

With the above configuration (3), the fitting region includes the partially tapered part formed on the back surface side of the compressor impeller, and a rod-like part formed between the partially tapered part and the tip of the compressor impeller. The rod-like part has the outer diameter which is equal to the minimum outer diameter of the partially tapered part and is uniform in the axial direction of the turbine. Thus, the rotor shaft is reliably seated in the through hole from the partially tapered part formed on the back surface side of the compressor impeller, when the rotation of the compressor impeller is stopped. As a result, the rotor shaft is secured to the through hole on the end surface on the back surface side of the compressor impeller while reliably maintaining the state in which the axial force receiving part, such as the sleeve, and the end surface on the back surface side of the compressor impeller are in contact with each other, making it possible to suppress formation of the gap between the axial force receiving part, such as the sleeve, and the end surface on the back surface side of the compressor impeller, more effectively.

Thus, based on the principle described in the above configuration (1), it is possible to provide the turbine shaft capable of suppressing generation of the gap between the compressor impeller and the axial force receiving part, such as the sleeve, even if the fastening part is loosened, and reducing the maintenance burden.

(4) A turbocharger according to at least one embodiment of the present invention includes a turbine including the turbine shaft according to any one of the above configurations (1) to (3), and a compressor including a compressor impeller fitted to the other end side of the turbine shaft.

With the above configuration (4), based on the principle described in the above configuration (1), it is possible to provide the turbocharger capable of suppressing generation of the gap between the compressor impeller and the axial force receiving part, such as the sleeve, even if the fastening part is loosened, and reducing the maintenance burden.

(5) In some embodiments, in the above configuration (4), the compressor impeller is configured to have a maximum wheel diameter at a position closest to the turbine impeller.

With the above configuration (5), since the compressor impeller has the maximum wheel diameter at the position closest to the turbine impeller (that is, the position where the compressor impeller and the axial force receiving part, such as the sleeve, are in contact with each other in the rotor shaft), the centrifugal force acting on the compressor impeller is maximum at the position where the compressor impeller and the axial force receiving part, such as the sleeve, are in contact with each other in the axial direction of the rotor shaft. Moreover, intake air, which is compressed and becomes hot, leaks and flows to the back surface side of the compressor impeller, and thus an influence of thermal expansion also acts on the compressor impeller, in addition to the centrifugal force. The behavior in recovery from the deformation of the compressor impeller when the rotation thereof is stopped is complicated, even if the tapered part, which has the maximum inner diameter at the position closest to the turbine impeller in the through hole of the compressor impeller and is formed such that the inner diameter of the through hole decreases from the position closest to the turbine impeller toward the tip side of the compressor impeller, is disposed for such a compressor impeller. Thus, the end surface position of the axial force receiving part, such as the sleeve, on the side of the compressor impeller in the fitting region of the rotor shaft may not necessarily be seated in the through hole of the compressor impeller ahead of the another part, when the rotation of the compressor impeller is stopped.

In this regard, only a centrifugal force, which is small compared to that for the compressor impeller, acts on the rotor shaft, and the rotor shaft is hardly influenced by the intake air which is compressed and becomes hot. Thus, it is possible to seat the end surface position of the axial force receiving part, such as the sleeve, on the side of the compressor impeller in the through hole of the compressor impeller ahead of the another part, more stably in the case in which the above-described tapered part is formed in the rotor shaft than in the case in which the tapered part is formed on the inner circumferential surface of the through hole of the compressor impeller.

(6) A manufacturing method of a turbocharger according to at least one embodiment of the present invention includes a step of preparing the turbine shaft according to any one of the above configurations (1) to (3), a step of preparing a compressor impeller, and a step of shrink-fitting the compressor impeller to a rotor shaft of the turbine shaft.

With the above manufacturing method (6), it is possible to manufacture the turbocharger in which generation of the gap between the compressor impeller and the axial force receiving part, such as the sleeve, is suppressed and the compressor impeller is stably seated in the rotor shaft, even if the compressor impeller undergoes thermal contraction by cooling in the manufacture.

Advantageous Effects

An object of some embodiments of the present invention is to provide a turbine shaft and a turbocharger capable of suppressing generation of a gap between a compressor impeller and an axial force receiving part, such as a sleeve, even if a fastening part is loosened, and reducing a maintenance burden.

BRIEF DESCRIPTION OF DRAWINGS

FIG. 8 is a step diagram showing manufacture of the turbocharger according to an embodiment of the present invention.

DETAILED DESCRIPTION

Embodiments of the present invention will now be described in detail with reference to the accompanying drawings.

However, the scope of the present invention is not limited to the following embodiments. It is intended that dimensions, materials, shapes, relative positions and the like of components described in the embodiments shall be interpreted as illustrative only and not intended to limit the scope of the present invention.

Figure 1:
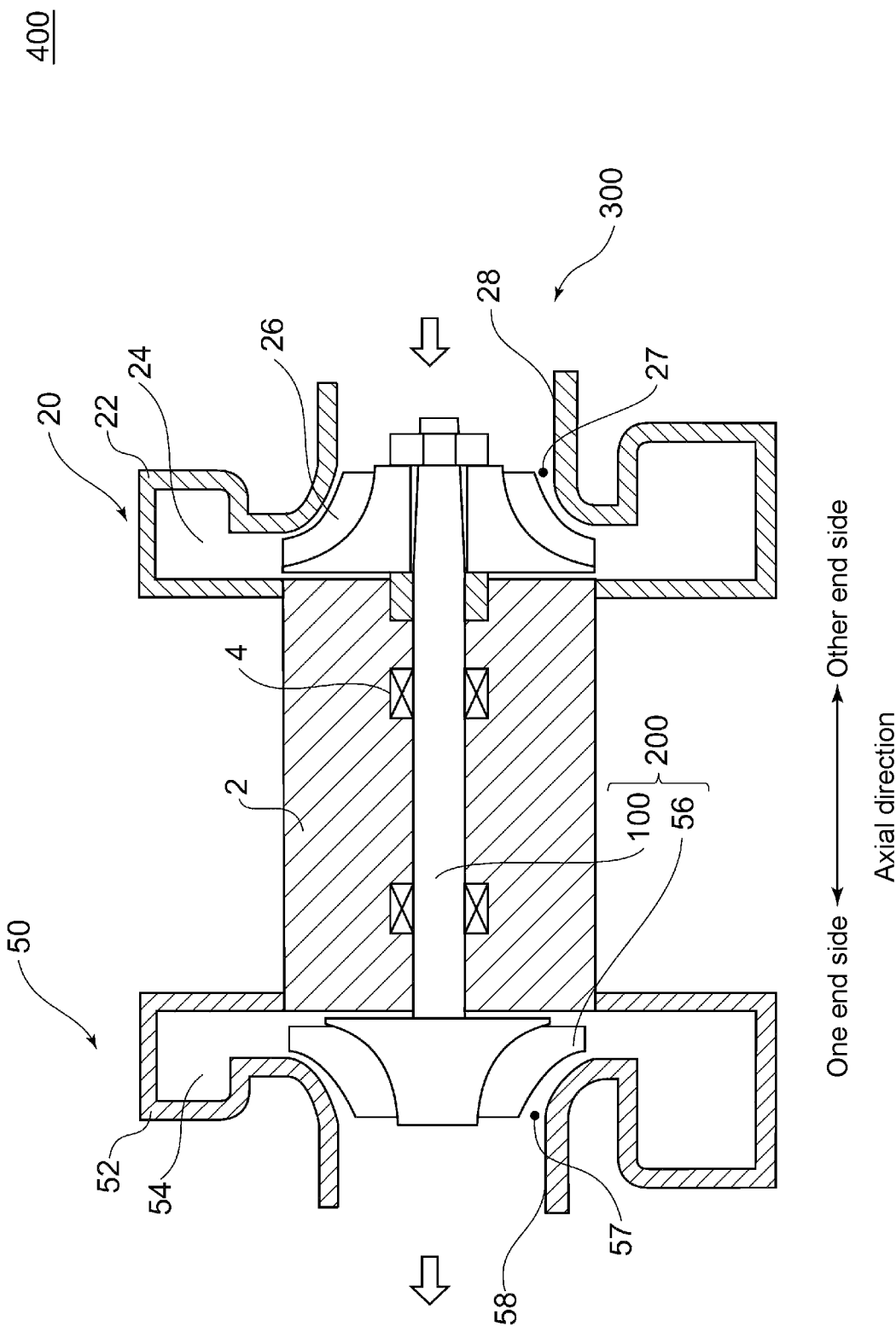
FIG. 1 is a schematic cross-sectional view showing the configuration of a turbocharger according to an embodiment of the present invention.

FIG. 1 is a schematic cross-sectional view showing the configuration of a turbocharger 400 according to an embodiment of the present invention. With reference to FIG. 1, the overview of the turbocharger 400 according to an embodiment of the present invention will be described. The turbocharger 400 according to an embodiment of the present invention includes a turbine 50 and a compressor 20.

The aforementioned turbocharger 400 includes a rotor shaft 100 positioned between the turbine 50 and the compressor 20, and coupling a turbine impeller 56 and compressor impeller 26 to be described later to each other. The turbine impeller 56 is joined to one end side of the rotor shaft 100. The rotor shaft 100 and the turbine impeller 56 thus joined will collectively be referred to as a turbine shaft 200. Moreover, the compressor impeller 26 is mounted on the other end side of the rotor shaft 100 (turbine shaft 200). The turbine shaft 200 and the mounted compressor impeller 26 will collectively be referred to as a turbine rotor 300. The rotor shaft 100 is supported rotatably by a bearing 4. The bearing 4 is housed in a bearing housing 2. In the axial direction of the rotor shaft 100, a turbine housing 52 constituting a casing for the turbine 50 is disposed on one side across the bearing housing 2, and a compressor housing 22 constituting a casing for the compressor 20 is disposed on the other side across the bearing housing 2.

The turbine 50 shown in FIG. 1 is driven by exhaust air discharged from an internal combustion engine (for example, a diesel engine or a gasoline engine) (not shown) used for a vehicle or the like. Such a turbine 50 may be, for example, a radial turbine or a mixed flow turbine. Moreover, the turbine 50 includes a scroll 54 formed by the turbine housing 52 and the turbine impeller 56 positioned on the radially inner side of the scroll 54. In the embodiment shown in FIG. 1, the turbine housing 52 forms, on the radially inner side of the scroll 54, an impeller housing space 57 where the turbine impeller 56 is housed, and an exhaust gas outlet part 58 adjacent to the impeller housing space 57 on an opposite side to the side of the bearing housing 2 in the axial direction.

The exhaust air discharged from the above-described internal combustion engine flows radially inward from the scroll 54 toward the turbine impeller 56 to drive the turbine 50. Then, the exhaust air having driven the turbine 50 is discharged outside via the exhaust gas outlet part 58.

The compressor 20 shown in FIG. 1 is coupled to the turbine 50 via the rotor shaft 100 and compresses a fluid (air) to be supplied to the internal combustion engine upon driving of the turbine 50. In the illustrated embodiment, the compressor 20 is constituted as a radial compressor discharging the compressed fluid (air) in the radial direction. However, the compressor 20 may be constituted as a mixed flow compressor discharging the compressed fluid (air) in an oblique direction. Moreover, the compressor 20 includes a scroll 24 formed by the compressor housing 22 and the compressor impeller 26 positioned on the radially inner side of the scroll 24. In the embodiment shown in FIG. 1, the compressor housing 22 forms, on the radially inner side of the scroll 24, an impeller housing space 27 where the compressor impeller 26 is housed, and an air inlet part 28 adjacent to the impeller housing space 27 on the opposite side to the side of the bearing housing 2 in the axial direction.

In the compressor 20 of the above-described configuration, the fluid (air) to be supplied to the internal combustion engine flows through the air inlet part 28 in the axial direction to be directed to the compressor impeller 26 and is compressed by the compressor impeller 26. Then, the fluid (air) having compressed is supplied to the internal combustion engine through the scroll 24.

Figure 2:
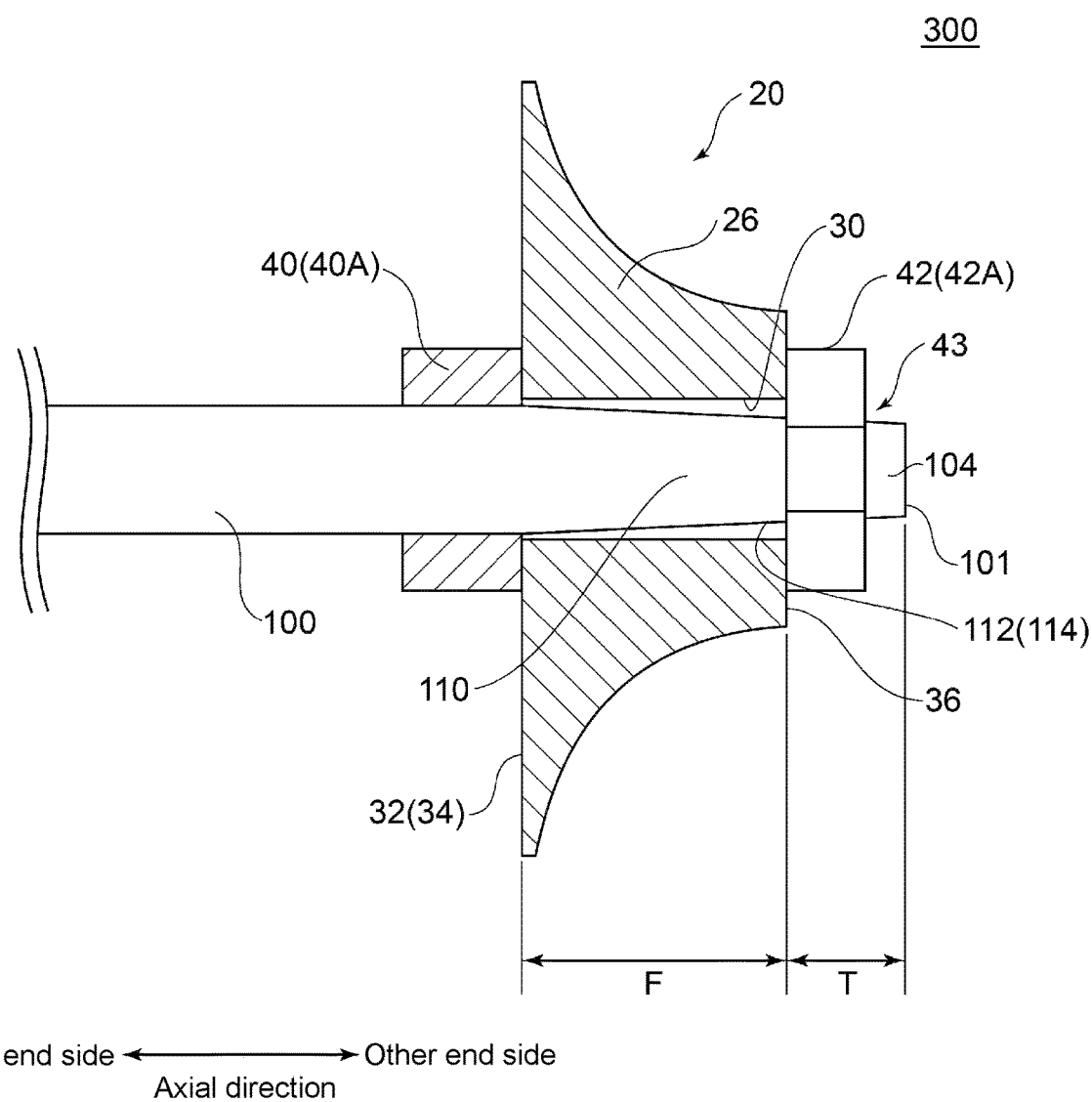
FIG. 2 is an enlarged cross-sectional view of a turbine rotor according to an embodiment of the present invention.

FIG. 2 is an enlarged cross-sectional view of the turbine rotor 300 according to an embodiment of the present invention. Each of FIGS. 3 and 5 to 7 is an enlarged cross-sectional view of the turbine rotor 300 according to another embodiment of the present invention. FIG. 4 shows schematic cross-sectional views each illustrating a fastening part 42 according to another embodiment.

Hereinafter, the structures of the turbine shaft 200 and turbine rotor 300 including the same will be described in detail, with reference to FIGS. 2, 3, and 5 to 7. The rotor shaft 100 of the turbine rotor 300 includes a fitting region 110 and a fastening region 104. The fitting region 110 is configured to fit with the compressor impeller 26 by inserting the other end side of the rotor shaft 100 into a through hole 30 formed in the compressor impeller 26 of the compressor 20. The fastening region 104 is formed between the fitting region 110 and the other end of the rotor shaft 100, and is configured to allow fastening by the fastening part 42 to be described later.

In an embodiment shown in each of FIGS. 2, 3, and 5 to 7, the other end side of the rotor shaft 100 is fitted with the compressor impeller 26 by being inserted into the through hole 30 formed in the compressor impeller 26 from the side of a back surface 32. The rotor shaft 100 is fitted with the compressor impeller 26, with an end surface 101 on the other end side of the rotor shaft 100 protruding from a tip surface 36 of the compressor impeller 26. In the illustrated embodiment, the through hole 30 and the fitting region 110 are shown to be spaced apart from each other, in order to facilitate understanding of the configuration of the turbine shaft 200 according to an embodiment of the present invention. However, the entirety of the fitting region 110 and the through hole 30 are in contact with each other, when the compressor impeller 26 is mounted on the turbine shaft 200.

The fitting region 110 of the rotor shaft 100 is a region fitting to the through hole 30 formed from the tip surface 36 to an end surface 34 on the side of the back surface 32 of the compressor impeller 26, in the axial direction. Fitting here includes tight fit where the outer diameter of the fitting region 110 is formed to be larger than the inner diameter of the through hole 30, medium fit where the outer diameter of the fitting region 110 is formed to have the same size as the inner diameter of the through hole 30, and loose fit where the outer diameter of the fitting region 110 is formed to be smaller than the inner diameter of the through hole 30. The end surface 34 means a surface of the back surface 32 closest to the turbine impeller 56, in the axial direction. In the embodiment shown in each of FIGS. 2, 3, 5, and 6, the entirety of the back surface 32 corresponds to the end surface 34. In the embodiment shown in FIG. 7, a position of the maximum outer diameter (maximum wheel diameter) of the compressor impeller 26 is shifted between the position of the end surface 34 and the tip surface 36, and thus a part of the back surface 32 corresponds to the end surface 34.

The fastening region 104 of the rotor shaft 100 includes a region configured to allow fastening by the fastening part 42 to be described later. In an embodiment shown in each of FIGS. 2, 3, and 5 to 7, the fastening part 42 is a nut 42A, and on the outer peripheral surface of the fastening region 104, a male screw part 43 to which the nut 42A can be screwed is formed. In the illustrated embodiment, the male screw part 43 is formed between a boundary position with the fitting region 110 and the end surface 101 on the other end side, and a region between the boundary position with the fitting region 110 and the end surface 101 on the other end side serves as the fastening region 104.

The fastening part 42 may be any part that can be attached to the fastening region 104 and can mount the compressor impeller 26 on the turbine shaft 200. The fastening part 42 may be, for example, the nut 42A as shown in each of FIGS. 2, 3, and 5 to 7, or may be a fitting part 42B that has an annular shape having a hole, which is slightly smaller than the outer circumference of the rotor shaft 100 or a fitting part 42C that has a bottomed cylindrical shape (cap shape) as shown in FIG. 4, the fitting part 42B, C being fitted to the tip part of the rotor shaft 100 to mount the compressor impeller 26 on the turbine shaft 200.

Moreover, in an embodiment shown in each of FIGS. 2, 3, and 5 to 7, the through hole 30 of the compressor impeller 26 has the same diameter in the axial direction.

Figure 3:
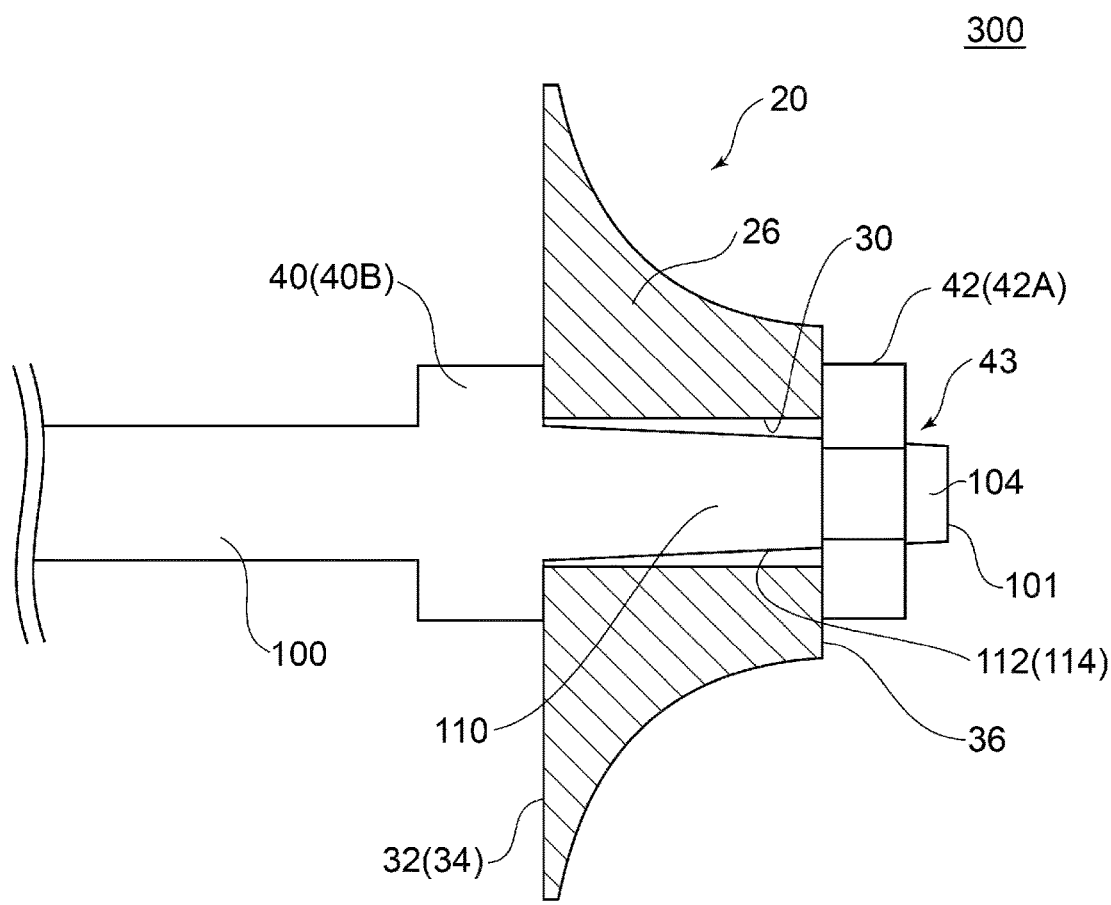
FIG. 3 is an enlarged cross-sectional view of the turbine rotor according to another embodiment of the present invention.
Figure 4A:
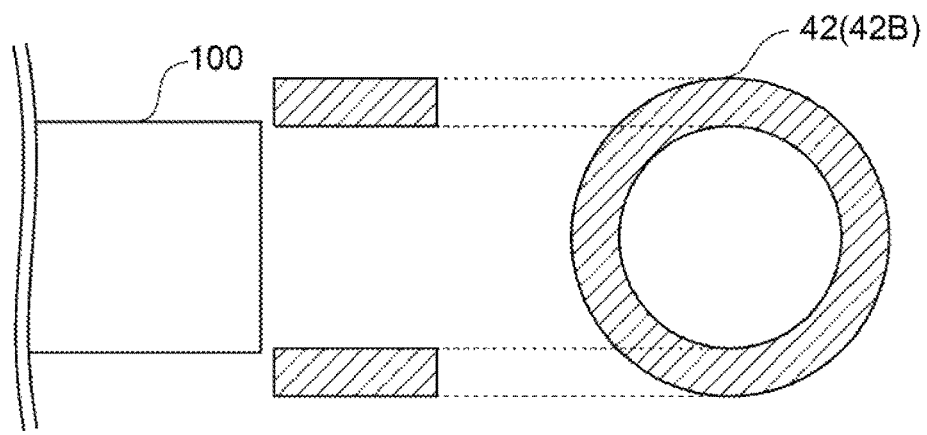
FIG. 4 shows schematic cross-sectional views each illustrating a fastening part according to another embodiment of the present invention.
Figure 4B:
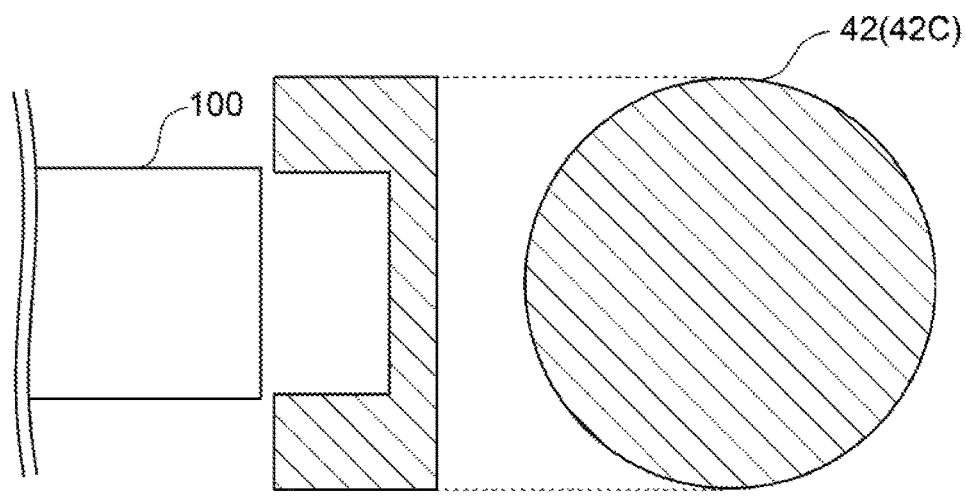

Moreover, in an embodiment shown in each of FIGS. 2, 3, and 5 to 7, an axial force receiving part 40 is formed at a position abutting on the end surface 34 on the side of the back surface 32 of the compressor impeller 26. The axial force receiving part 40 may be any part capable of receiving an axial force generated by pressing from the fastening part 42. The axial force receiving part 40 may be, for example, a sleeve 40A attached to the rotor shaft 100 of the turbine shaft 200 as shown in each of FIGS. 2 and 5 to 7 or may be a flange part 40B formed in the rotor shaft 100 as shown in FIG. 3.

When the compressor impeller 26 is mounted on the turbine shaft 200, first, the other end side of the rotor shaft 100 is inserted into the through hole 30 of the compressor impeller 26, making the end surface 34 on the side of the back surface 32 of the compressor impeller 26 abut on the axial force receiving part 40. Then, the fastening part 42 is attached to the fastening region 104 protruding from the tip surface 36 of the compressor impeller 26, pressing the compressor impeller 26 against the axial force receiving part 40. Thus, the compressor impeller 26 is mounted on the turbine shaft 200 and is fixed so as not to slip out.

Then, the turbine shaft 200 according to an embodiment of the present invention includes a tapered part 112 having the maximum outer diameter at a position closest to the turbine impeller 56 in the fitting region 110 and formed such that the outer diameter of the rotor shaft 100 decreases from the position closest to the turbine impeller 56 toward the side of the tip surface 36 of the compressor impeller 26. That is, the fitting region 110 is configured such that the outer diameter thereof continuously decreases from the position closest to the turbine impeller 56 toward the side of the tip surface 36 of the compressor impeller 26.

With the above configuration, at the stop of the rotation of the compressor impeller 26 which extends in the radial direction and contracts in the axial direction by the centrifugal force in the high-speed rotation, an end surface position of the axial force receiving part 40 on the side of the compressor impeller 26 in a fitting region F of the rotor shaft 100 is seated in the through hole 30 of the compressor impeller 26 ahead of another part. At this time, the rotor shaft 100 is seated at the position closest to the turbine impeller 56 in the through hole 30 of the compressor impeller 26, that is, the end surface 34 on the side of the back surface 32 of the compressor impeller 26. Thus, the rotor shaft 100 is seated in the through hole 30 of the compressor impeller 26 in a state in which the end surface 34 on the side of the back surface 32 of the compressor impeller 26 is in contact with the axial force receiving part 40. Thus, the compressor impeller 26 having contracted in the axial direction in the high-speed rotation is reversed with the antecedently seated part as a starting point, while maintaining the state in which the end surface 34 on the side of the back surface 32 of the compressor impeller 26 and the axial force receiving part 40 are in contact with each other. Accordingly, the compressor impeller does not shift to the side of the tip surface 36, making it possible to suppress formation of a gap between the axial force receiving part 40 and the end surface 34 on the side of the back surface 32 of the compressor impeller 26. Thus, it is possible to provide the turbine shaft 200 capable of suppressing generation of the gap between the compressor impeller 26 and the axial force receiving part 40 even if the fastening part 42 is loosened, and reducing a maintenance burden.

In an embodiment shown in each of FIGS. 2, 3, and 5 to 7, the tapered part 112 is configured such that the outer diameter thereof linearly decreases from the position closest to the turbine impeller 56 toward the side of the tip surface 36 of the compressor impeller 26.

Figure 6:
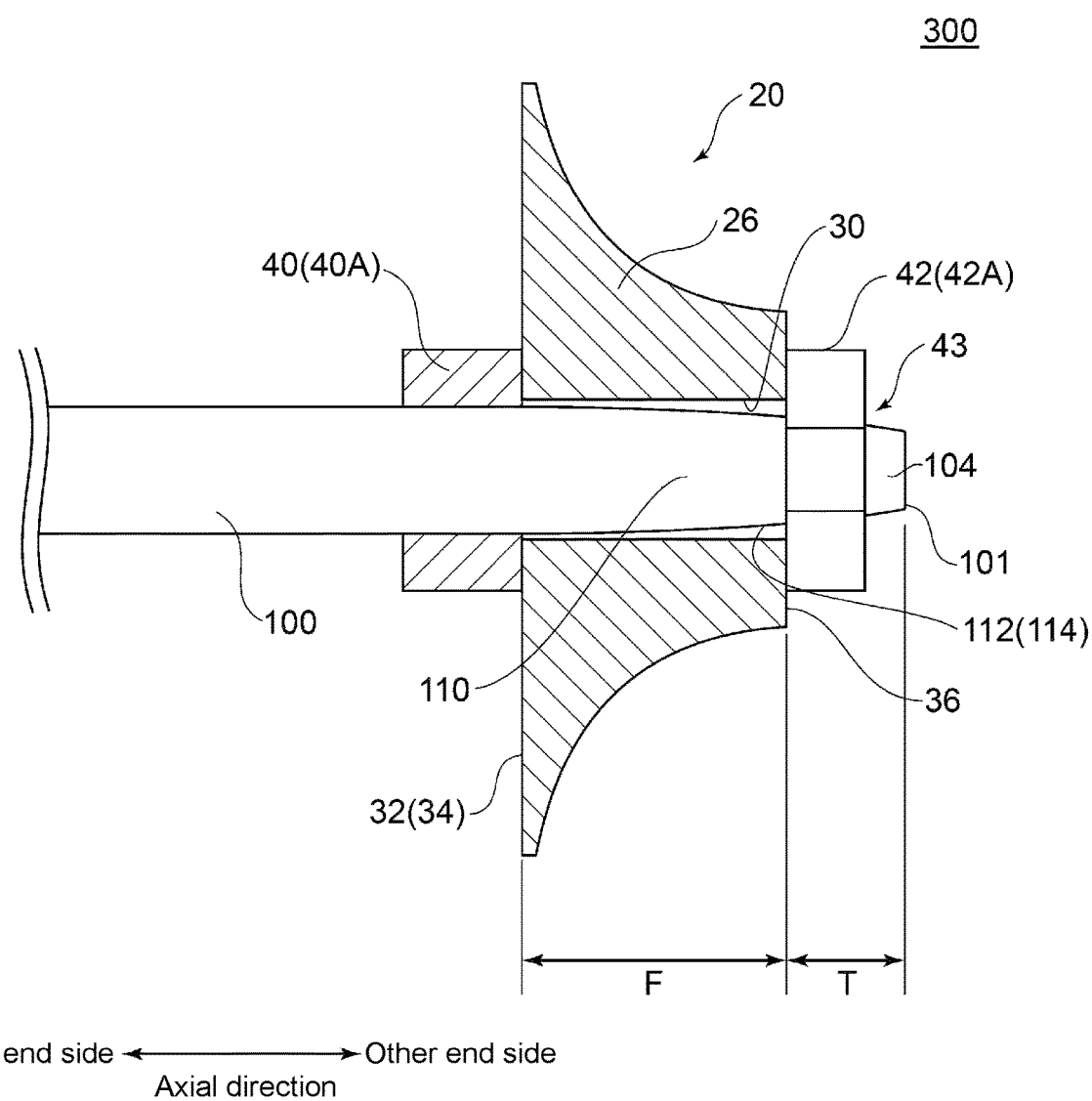
FIG. 6 is an enlarged cross-sectional view of the turbine rotor according to another embodiment of the present invention.
Figure 7:
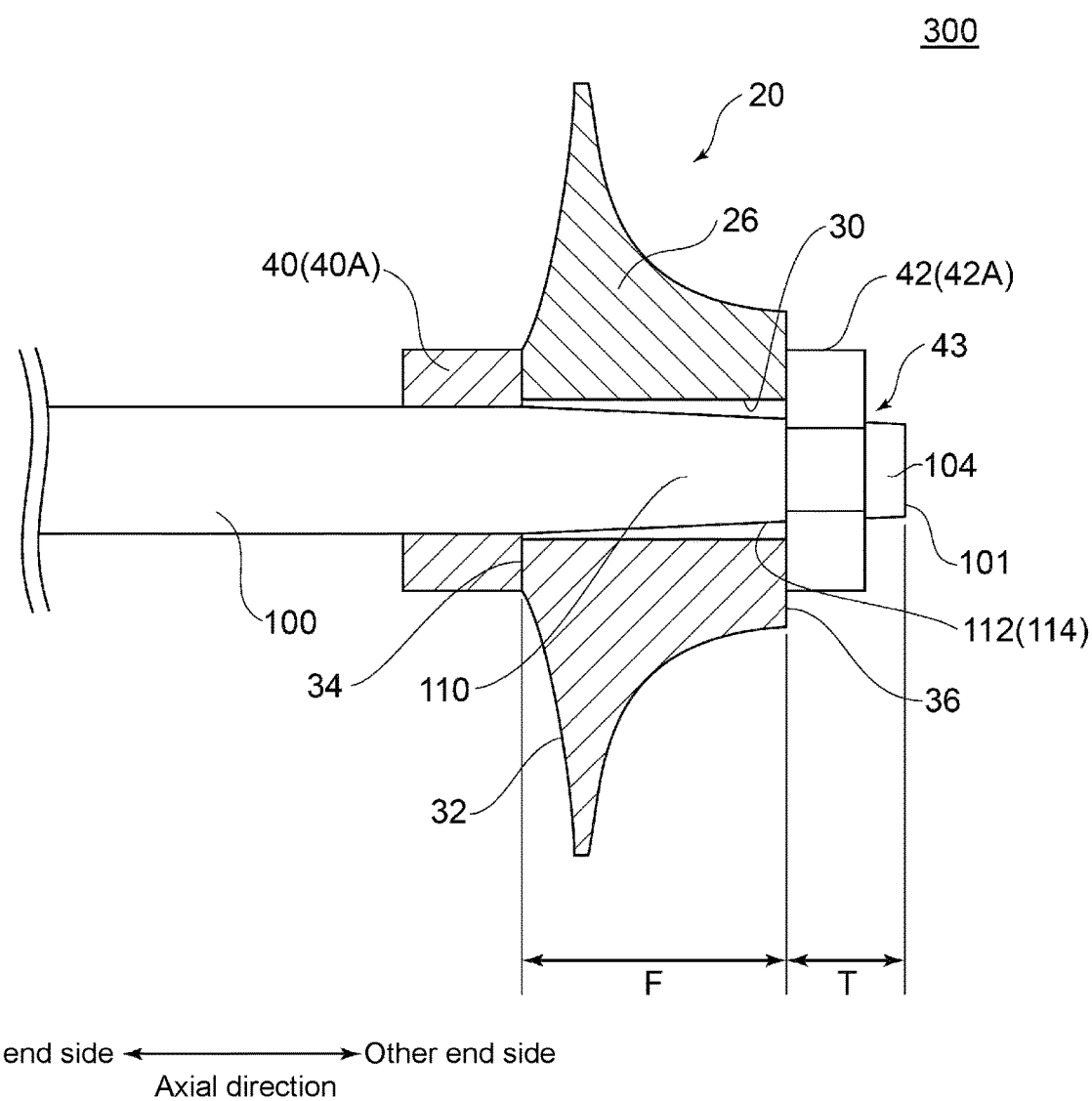
FIG. 7 is an enlarged cross-sectional view of the turbine rotor according to another embodiment of the present invention.

Moreover, in some embodiments, as shown in FIG. 6, the tapered part 112 is configured such that the outer diameter thereof decreases curvilinearly to be convex radially outward, from the position closest to the turbine impeller 56 toward the side of the tip surface 36 of the compressor impeller 26. Thus, a region close to the back surface 32 of the compressor impeller 26, which includes the position closest to the turbine impeller 56 in the through hole 30 of the compressor impeller 26, is seated in the rotor shaft 100 rapidly, as compared with a case in which the tapered part 112 is formed linearly. Therefore, it is possible to further prevent the compressor impeller from shifting to the side of the tip surface 36.

The above-described tapered part 112 will be described in detail with reference to FIGS. 2, 3 and 5. As shown in FIGS. 2 and 3, the tapered part 112 may be an entirely tapered part 114 formed over the entirety of the fitting region 110. That is, in the fitting region 110, the outer diameter of the rotor shaft 100 decreases gradually from the side of the back surface 32 of the compressor impeller 26 toward the side of the tip surface 36 of the compressor impeller 26. Thus, the outer diameter of the fitting region 110 is maximum at the position of the end surface 34 on the side of the back surface 32 of the compressor impeller 26 and is minimum at an axially outermost position of the fitting region 110.

With the above configuration, in the rotor shaft 100 fitted to the through hole 30 in the fitting region F, the end surface position of the axial force receiving part 40 on the side of the compressor impeller 26 in the fitting region F is reliably seated in the through hole 30 ahead of the another part, when the rotation of the compressor impeller 26 is stopped. Subsequently, the rotor shaft 100 is gradually seated in the through hole 30 from the side of the back surface 32 toward the side of the tip surface 36 of the compressor impeller 26. As a result, the compressor impeller 26 having contracted in the axial direction is reversed with the antecedently seated part as the starting point, while reliably maintaining the state in which the end surface 34 on the side of the back surface 32 of the compressor impeller 26 and the axial force receiving part 40 are in contact with each other. Thus, it is possible to suppress formation of the gap between the axial force receiving part 40 and the end surface 34 on the side of the back surface 32 of the compressor impeller 26, more effectively. Thus, it is possible to provide the turbine shaft 200 capable of suppressing generation of the gap between the compressor impeller 26 and the axial force receiving part 40 even if the fastening part 42 is loosened, and reducing the maintenance burden.

Figure 5:
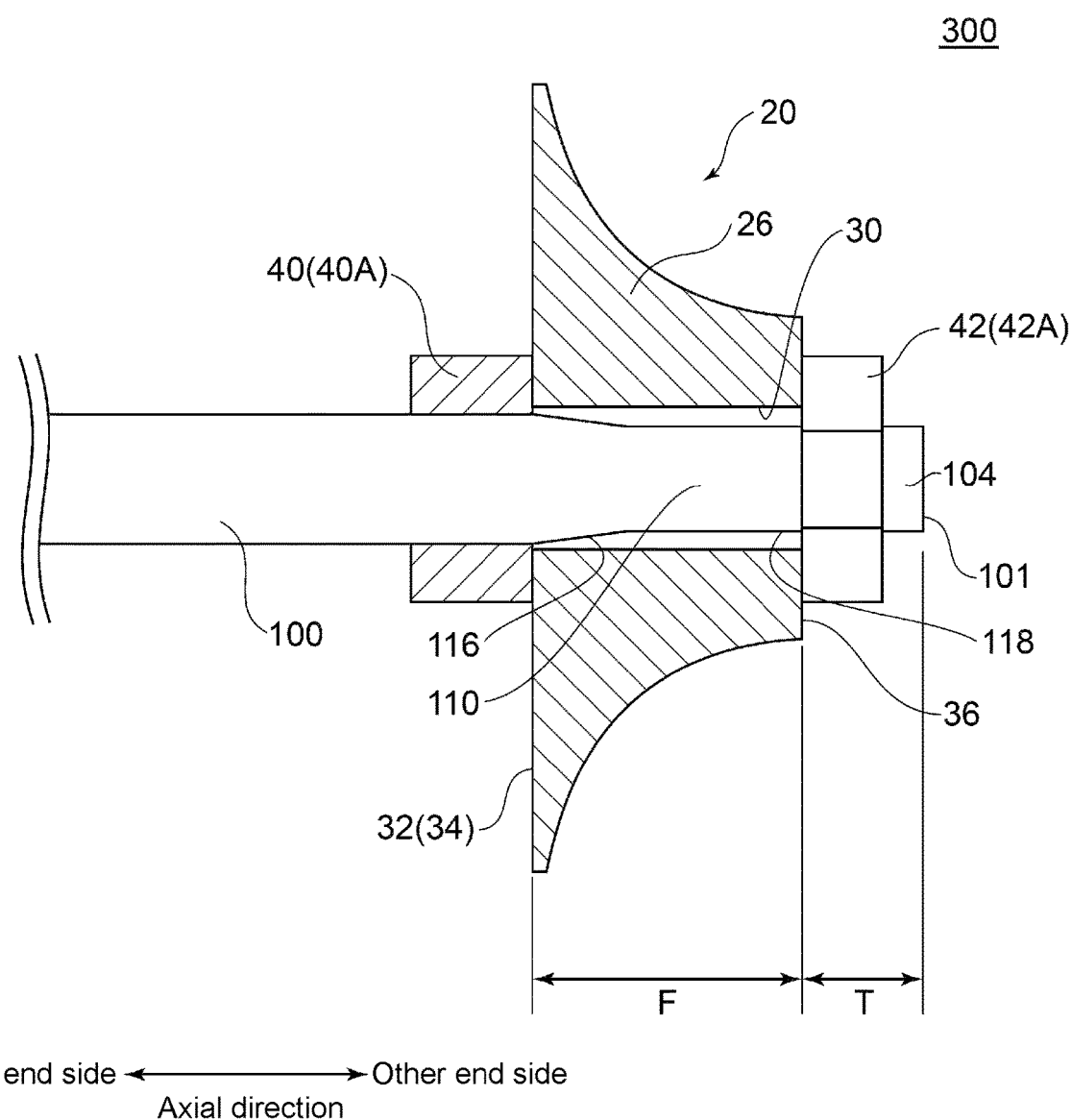
FIG. 5 is an enlarged cross-sectional view of the turbine rotor according to another embodiment of the present invention.

Moreover, as shown in FIG. 5, the tapered part 116 may be formed over a part of the fitting region 110. For example, in the exemplary embodiment shown in FIG. 5, the fitting region 110 includes a partially tapered part 116 on the side of the back surface 32 of the compressor impeller 26, and a rod-like part 118 formed between the partially tapered part 116 and the tip surface 36 of the compressor impeller 26. The outer diameter of the partially tapered part 116 decreases gradually from the side of the back surface 32 of the compressor impeller 26 toward the side of the tip surface 36 of the compressor impeller 26. Thus, the outer diameter of the partially tapered part 116 is maximum at the position of the end surface 34 on the side of the back surface 32 of the compressor impeller and is minimum at an axially outermost (that is, the side of the tip surface 36 of the compressor impeller 26) position of the partially tapered part 116. Moreover, the rod-like part 118 is connected to the partially tapered part 116 at the axially outermost (that is, the side of the tip surface 36 of the compressor impeller 26) position of the partially tapered part 116, and has the outer diameter equal to the minimum outer diameter of the partially tapered part 116. Furthermore, the outer diameter of the rod-like part 118 is uniform in the axial direction thereof.

With the above configuration, the rotor shaft 100 is reliably seated in the through hole 30 from the partially tapered part 116 formed on the side of the back surface 32 of the compressor impeller 26, when the rotation of the compressor impeller 26 is stopped. As a result, the rotor shaft 100 is secured to the through hole 30 on the end surface 34 on the side of the back surface 32 of the compressor impeller 26, while reliably maintaining the state in which the axial force receiving part 40 and the end surface 34 on the side of the back surface 32 of the compressor impeller 26 are in contact with each other, making it possible to suppress formation of the gap between the axial force receiving part 40 and the end surface 34 on the side of the back surface 32 of the compressor impeller 26, more effectively. Thus, it is possible to provide the turbine shaft 200 capable of suppressing generation of the gap between the compressor impeller 26 and the axial force receiving part 40 even if the fastening part 42 is loosened, and reducing the maintenance burden.

Next, the turbocharger 400 including the above-described turbine shaft 200 (the rotor shaft 100 includes the tapered part 112) will be described in detail. The turbocharger 400 according to an embodiment of the present invention includes the turbine 50 including the above-described turbine shaft 200, and the compressor 20 including the compressor impeller 26 fitted to the other end side of the turbine shaft 200.

With the above configuration, it is possible to provide the turbine shaft 200 capable of suppressing generation of the gap between the compressor impeller 26 and the axial force receiving part 40 even if the fastening part 42 is loosened, and reducing the maintenance burden.

The turbocharger 400 according to another embodiment of the present invention may be configured such that the compressor impeller 26 has a wheel diameter which is maximum at the position closest to the turbine impeller 56 in the axial direction. That is, the wheel diameter is maximum at the position where the compressor impeller 26 and the axial force receiving part 40 are in contact with each other in the rotor shaft 100. In the above configuration, the position where the wheel diameter of the compressor impeller 26 is maximum and the position where the outer diameter of the fitting region 110 of the rotor shaft 100 is maximum are the same in the axial direction.

With the above configuration, the centrifugal force acting on the compressor impeller 26 is maximum at the position where the compressor impeller 26 and the axial force receiving part 40 are in contact with each other in the axial direction of the rotor shaft 100. Moreover, intake air, which is compressed and becomes hot, leaks and flows to the side of the back surface 32 of the compressor impeller 26, and thus an influence of thermal expansion also acts on the compressor impeller 26, in addition to the centrifugal force. Thus, for example, the compressor impeller 26 of the above-described configuration may further extend in the radial direction by the centrifugal force in the high-speed rotation, as compared with the compressor impeller 26 of the configuration in which the wheel diameter of the compressor impeller 26 is maximum not on the back surface 32 of the compressor impeller 26, but between the back surface 32 and the tip (the end surface 101 on the other end side in the axial direction). On the other hand, only a centrifugal force, which is small compared to that for the compressor impeller 26, acts on the rotor shaft 100, and the rotor shaft 100 is hardly influenced by the intake air which is compressed and becomes hot. Thus, forming the above-described tapered part 112 in the rotor shaft 100, it is possible to seat the end surface position of the axial force receiving part 40 on the side of the compressor impeller 26 in the through hole 30 of the compressor impeller 26 ahead of the another part, more stably than in a case in which the tapered part is formed on the inner circumferential surface of the through hole 30 of the compressor impeller 26.

FIG. 8 is a step diagram showing manufacture of the turbocharger according to an embodiment of the present invention. Hereinafter, a manufacturing method of the turbocharger 400, which includes the turbine shaft 200 with the rotor shaft 100 including the tapered part 112, will be described in detail with reference to FIG. 8.

The manufacturing method of the turbocharger 400 according to at least one embodiment of the present invention includes a step S1 of preparing the turbine shaft 200 with the rotor shaft 100 including the tapered part 112, a step S2 of preparing the compressor impeller 26, and a step S3 of shrink-fitting the compressor impeller 26 to the rotor shaft 100 of the turbine shaft 200. The step S 3 of shrink-fitting the compressor impeller 26 to the rotor shaft 100 of the turbine shaft 200 further includes a step S31 of heating the compressor impeller 26, a step S 32 of press fitting the heated compressor impeller 26, and a step S 33 of cooling the press fitted compressor impeller 26. As shown in FIG. 8, the step S2 of preparing the compressor impeller 26 is not necessarily started after the step S1 of preparing the turbine shaft 200 with the rotor shaft 100 including the tapered part 112, and the step S1 of preparing the turbine shaft 200 with the rotor shaft 100 including the tapered part 112 may be started after the step S2 of preparing the compressor impeller 26 is finished.

With the above-described manufacturing method, it is possible to manufacture the turbocharger 400 in which generation of the gap between the compressor impeller 26 and the axial force receiving part 40, such as the sleeve 40A, is suppressed and the compressor impeller 26 is stably seated in the rotor shaft 100, even if the compressor impeller 26 is cooled and undergoes thermal contraction in the manufacture.

The embodiments of the present invention have been described above. However, the present invention is not limited thereto, and various modifications may be applied as long as they do not depart from the object of the present invention.

REFERENCE SIGNS LIST

2 Bearing housing
4 Bearing
20 Compressor
22 Compressor housing
24 Scroll
26 Compressor impeller
27 Impeller housing space
28 Air inlet part
30 Through-hole
32 Back surface
34 End surface
36 Tip surface
40 Axial force receiving part
40A Sleeve
40B Flange part
42 Fastening part
42A Nut
42B Fitting part
42C Fitting part
43 Male screw part
50 Turbine
52 Turbine housing
54 Scroll
56 Turbine impeller
57 Impeller housing space
58 Exhaust gas outlet part
100 Rotor shaft
101 End surface
104 Fastening region
110 Fitting region
112 Tapered part
114 Entirely tapered part
116 Partially tapered part
118 Rod-like part
200 Turbine shaft
300 Turbine rotor
400 Turbocharger
F Fitting region
T Fastening region

The invention claimed is:

1. A turbocharger comprising:
a turbine including a rotor shaft and a turbine impeller, the turbine impeller joined on one end side of the rotor shaft; and
a compressor including a compressor impeller fitted to the other end side of the rotor shaft,
wherein the rotor shaft includes:
a fitting region configured to fit with the compressor impeller of the compressor by inserting the other end side of the rotor shaft into a through hole formed in the compressor impeller;
a fastening region formed between the fitting region and the other end side of the rotor shaft, and configured to allow fastening by a fastening part; and
a tapered part having a maximum outer diameter at a position closest to the turbine impeller in the fitting region and formed such that an outer diameter of the rotor shaft decreases from the position closest to the turbine impeller toward a tip side of the compressor impeller, and
wherein the through hole of the compressor impeller has the same diameter in an axial direction, and
wherein the entirety of the fitting region and the compressor impeller are in contact with each other, when the compressor impeller is mounted on the turbine shaft.

2. The turbocharger according to claim 1,
wherein the tapered part is constituted by an entirely tapered part formed over an entirety of the fitting region.

3. The turbocharger according to claim 1,
wherein the tapered part is constituted by a partially tapered part formed in a part of the fitting region.

4. The turbocharger according to claim 1,
wherein the compressor impeller is configured to have a maximum wheel diameter at a position closest to the turbine impeller.

5. A manufacturing method of a turbocharger, comprising:
a step of preparing the rotor shaft according to claim 1;
a step of preparing a compressor impeller; and
a step of shrink-fitting the compressor impeller to the rotor shaft.

* * * * *